(12) United States Patent
Fletcher (10) Patent No.: US 8,186,592 B2
(45) Date of Patent: May 29, 2012

(54) UNIVERSAL STAND FOR INDICIA READERS

(75) Inventor: Donna M. Fletcher, Auburn, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 212 days.

(21) Appl. No.: 12/632,382

(22) Filed: Dec. 7, 2009

(65) Prior Publication Data

US 2011/0132984 A1   Jun. 9, 2011

(51) Int. Cl.
*G06K 7/10* (2006.01)
*G06K 7/14* (2006.01)
*G06K 15/12* (2006.01)
*G06K 9/22* (2006.01)

(52) U.S. Cl. .............. 235/454; 235/462.01; 235/462.32; 235/462.41; 235/462.45; 235/462.48

(58) Field of Classification Search ............. 235/462.32, 235/462.41, 462.45, 462.46, 462.43, 462.48, 235/462.01, 454
See application file for complete search history.

(56) References Cited

U.S. PATENT DOCUMENTS

| | | | |
|---|---|---|---|
| 4,766,297 A * | 8/1988 | McMillan | 235/462.07 |
| 4,963,721 A * | 10/1990 | Kohno et al. | 186/61 |
| 4,988,851 A * | 1/1991 | Kohno et al. | 186/61 |
| 5,192,857 A * | 3/1993 | Detwiler | 235/462.39 |
| 5,382,007 A | 1/1995 | Holzheimer | |
| 5,406,063 A * | 4/1995 | Jelen | 235/462.46 |
| D359,483 S * | 6/1995 | Saunders et al. | D14/420 |
| 5,437,079 A | 8/1995 | Park | |
| 5,478,998 A * | 12/1995 | Charych et al. | 235/462.43 |
| 5,508,505 A * | 4/1996 | Walts et al. | 235/462.46 |
| 5,736,726 A * | 4/1998 | VanHorn et al. | 235/472.02 |
| 5,756,984 A * | 5/1998 | Kobayashi | 235/462.45 |
| 5,796,091 A * | 8/1998 | Schmidt et al. | 235/472.01 |
| 6,216,951 B1 * | 4/2001 | Swift et al. | 235/462.45 |
| 6,216,953 B1 * | 4/2001 | Kumagai et al. | 235/472.01 |
| 6,719,201 B2 * | 4/2004 | Tamburrini et al. | 235/462.07 |
| D493,802 S | 8/2004 | Berentzen et al. | |
| 7,472,825 B2 | 1/2009 | Fitch et al. | |
| 7,690,614 B1 * | 4/2010 | Mudd et al. | 248/346.06 |
| 2001/0000907 A1 * | 5/2001 | Knowles et al. | 235/462.22 |
| 2002/0023960 A1 * | 2/2002 | Knowles et al. | 235/472.01 |
| 2002/0056750 A1 * | 5/2002 | Kato et al. | 235/454 |
| 2002/0066838 A1 * | 6/2002 | Katoh et al. | 248/133 |
| 2002/0104886 A1 * | 8/2002 | Martin et al. | 235/462.45 |
| 2002/0170968 A1 * | 11/2002 | Blake et al. | 235/462.11 |
| 2002/0195497 A1 * | 12/2002 | Kumagai et al. | 235/472.01 |

(Continued)

OTHER PUBLICATIONS

Author unlisted, Metrologic Instruments, Inc., 90 Coles Rd., Blackwood, NJ 08012-4683, e-mail: info@metrologic.com, MS7580 Genesis (TM) Presentation Area Imager Installation and User's Guide, pp. 1 through 48.

(Continued)

*Primary Examiner* — Daniel Walsh
(74) *Attorney, Agent, or Firm* — Hiscock & Barclay, LLP (57) ABSTRACT

A universal stand for holding a reading device that collects and processes machine readable data comprising: a base adapted for placement on a surface for providing holding stability for the reading device; a cradle arm having a flange portion and a cradle portion; and, a hinge for rotatably connecting the cradle arm to the base, wherein the cradle arm is adapted to be replaceable so that the base may be utilized for providing holding stability for more than one reading device.

5 Claims, 4 Drawing Sheets

U.S. PATENT DOCUMENTS

| | | | |
|---|---|---|---|
| 2003/0001018 A1 | 1/2003 | Hussey et al. | |
| 2003/0071127 A1* | 4/2003 | Bryant et al. | 235/462.43 |
| 2003/0201329 A1* | 10/2003 | Kumagai et al. | 235/462.32 |
| 2004/0149829 A1* | 8/2004 | Boucher et al. | 235/462.43 |
| 2007/0017997 A1* | 1/2007 | Talley et al. | 235/462.43 |
| 2007/0267501 A1 | 11/2007 | Jovanovski et al. | |
| 2008/0121721 A1* | 5/2008 | Chen et al. | 235/462.45 |
| 2009/0108076 A1* | 4/2009 | Barkan et al. | 235/462.48 |
| 2009/0127343 A1* | 5/2009 | Chiang | 235/462.43 |
| 2009/0127411 A1* | 5/2009 | Aguilar | 248/205.8 |
| 2009/0218405 A1* | 9/2009 | Joseph et al. | 235/462.42 |
| 2010/0237997 A1* | 9/2010 | Asai | 340/10.1 |
| 2011/0069877 A1* | 3/2011 | Vincenzi | 382/135 |
| 2011/0073658 A1* | 3/2011 | Vassura et al. | 235/472.01 |
| 2011/0080263 A1* | 4/2011 | Theile et al. | 340/10.1 |
| 2011/0121075 A1* | 5/2011 | Bellows et al. | 235/440 |
| 2011/0132984 A1* | 6/2011 | Fletcher | 235/454 |

OTHER PUBLICATIONS

Author unlisted, Metrologic Instruments, Inc., 90 Coles Rd., Blackwood, NJ 08012-4683, e-mail: info@metrologic.com, MS7580 Genesis (TM) Supplemental Guide for EAS Equipped Models, pp. 1 through 16.

* cited by examiner

UNIVERSAL STAND FOR INDICIA READERS

FIELD OF THE INVENTION

The present invention relates to indicia reading device stands, and more particularly to a universal stand for multiple indicia reading devices.

BACKGROUND

Indicia reading devices (also referred to as imagers, scanners, readers, indicia readers, etc.) may be adapted to read data represented by information bearing indicia, (also referred to as symbols, symbology, bar codes, etc.). For instance one type of a symbol is an array of rectangular bars and spaces that are arranged in a specific way to represent elements of data in machine readable form. Indicia reading devices typically transmit light onto a symbol and receive light scattered and/or reflected back from a bar code symbol or indicia. The received light is interpreted by a processor which performs signal and/or image processing to extract the data represented by the symbol. Optical indicia reading devices typically utilize visible or infrared light. Indicia readers may also read other types of data, such as an RFID instrument, biogenic information such as a fingerprint, etc.

One-dimensional (1D) optical bar code readers are characterized by reading data that is encoded along a single axis, in the widths of bars and spaces, so that such symbols may be read from a single scan along that axis, provided that the symbol is sampled with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, some or all of which must be scanned and decoded, then linked together to form a complete message. Scanning still requires relatively higher resolution in one dimension only, but multiple linear scans at different locations on a second dimension are needed to read the whole symbol.

A class of bar code symbologies known as two dimensional (2D) matrix symbologies have been developed which require image based reading and offer greater data densities and capacities than 1D symbologies. 2D matrix codes encode data as dark or light data elements within a regular polygonal matrix, accompanied by graphical finder, orientation and reference structures.

Often times an indicia reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or optical transceiver for communicating with a remote computer.

Some data collection devices, such as hand-held indicia readers, are capable of capturing images as well as reading barcodes. The reading and decoding of a barcode represents an operation distinct from that involved in capturing an image. The reading and decoding of a bar code involves the imaging and then decoding of a one or two dimensional graphic symbol into the alphanumeric, full ASCII or other data sequence encoded by the symbol. The capturing of an image involves storing an electronic visual copy/representation of the image.

Efforts regarding such systems have led to continuing developments to improve their versatility, practicality and efficiency.

DETAILED DESCRIPTION

Reference will now be made to exemplary embodiments which are illustrated in the accompanying drawings. Other embodiments may be in various forms and the exemplary embodiments should not be construed as limited to the embodiments set forth herein. Rather, these representative embodiments are described in detail so that this disclosure will be thorough and complete, and will fully convey the scope, structure, operation, functionality, and potential applicability to those skilled in the art. Wherever possible, the same reference numbers will be used throughout the drawings to refer to the same or like parts. The term "scan" or "scanning" used herein refers to reading or extracting data from an information bearing indicia (or symbol). The term imaging used herein refers to the taking or creation of an electronic image.

Figure 1:
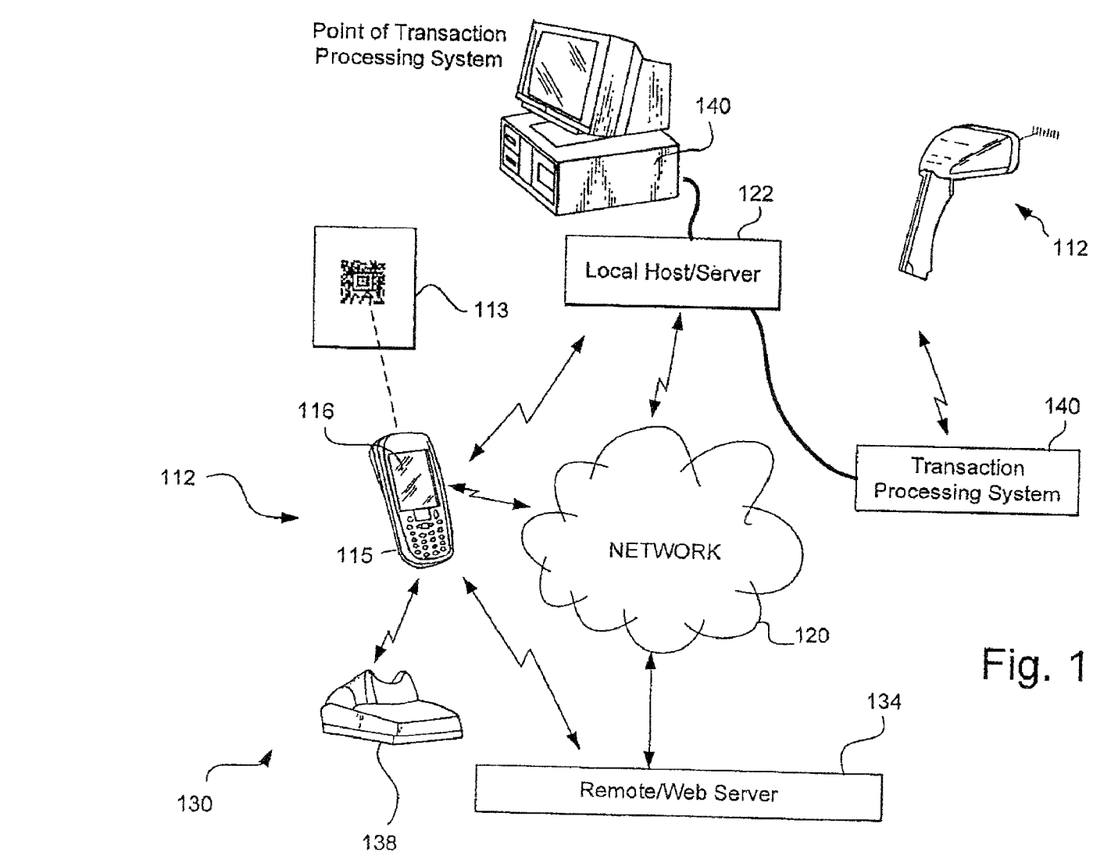
FIG. 1 is a block diagram of an exemplary reader system.
Figure 2:
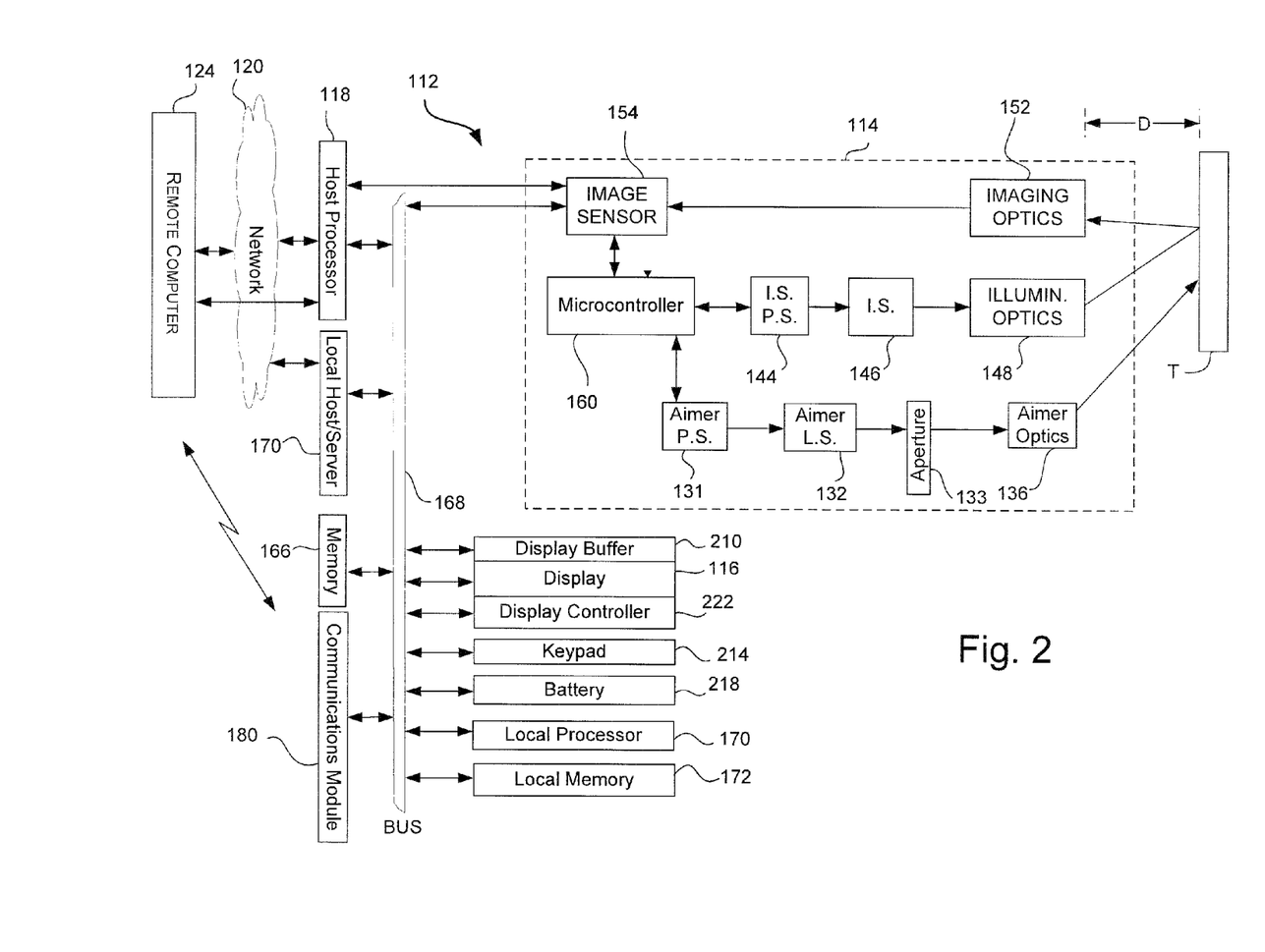
FIG. 2 is a block schematic diagram of an exemplary reader.

FIGS. 1 and 2 illustrate an exemplary scanning system configuration, wherein a plurality of readers 112 are being operated or utilized in an establishment or facility, such as a retail store.

A human operator may aim a hand-held reader 112 having an reader 112 at a target containing an information bearing indicia (IBI) 113 or dataform, text, or other element and actuate a trigger 115 on the reader. An IBI or dataform may be an originally machine generated symbology that is also machine readable, such as a 1-D barcode, a 2-D barcode, a 1-D stacked barcode, a logo, glyphs, color-codes, and the like.

When using an embodiment of an reader, a human operator may intuitively point the reader directly at the data to be collected, regardless of its type, and actuate a trigger.

An exemplary reader 112 may be a mobile device, such as a hand held scanner, a portable data terminal (PDT), a personal digital assistant (PDA), a mobile phone, a transaction terminal etc. A Portable Data Terminal, or PDT, is typically an electronic device that is used to enter or retrieve data via wireless transmission (WLAN or WWAN) and may also serve as a reader used in stores, warehouse, hospital, or in the field to access a database from a remote location. Personal Digital Assistants (PDAs) are handheld devices typically used as a personal organizer, and may have many uses such as calculating, use as a clock and calendar, playing computer games, accessing the Internet, sending and receiving E-mails, use as a radio or stereo, video recording, recording notes, use as an address book, and use as a spreadsheet. The reader may have a display 116.

An exemplary reader has an image sensor which digitizes a representative image seen in an imaging field of view. The readers may be in communication (wired or wireless) to a local transaction processing system 140, such as a cash register, customer station or employee station. The transaction processing systems 140 may be at a point of transaction (POT) or sale and may be in communication (wired or wireless) with a local server 122. The local server 122 may be in communication with network 120 and or a remote/web server 134.

An exemplary reader 112 may have a number of subsystems for capturing and reading images, some of which may have symbol indicia provided therein or thereon. Reader 112 may have an optical reader assembly 114 provided within a head portion of a housing 117 which may be configured to be hand held by an operator. A trigger 115 may be used to control operation of the reader 112. Optical reader assembly 114 has imaging receive optics 152 having an optical axis (OA) for receiving light reflected from a target T and directing or projecting the reflected light from the target T to an back-illuminated image sensor 154. The optical axis is a line of symmetry through the imaging optics.

The receive optics 152 has a focal point wherein parallel rays of light coming from infinity converge at the focal point. If the focal point is coincident with the back-illuminated image sensor, the target (at infinity) is "in focus". A target T is said to be in focus if light from target points are converged about as well as desirable at the back-illuminated image sensor. Conversely, it is out of focus if light is not well converged. "Focusing" is the procedure of adjusting the distance between the receive optics and the back-illuminated image sensor to cause the target T to be approximately in focus. The target may be any object or substrate and may bear a 1D or 2D bar code symbol or text or other machine readable indicia. A trigger 115 may be used for controlling full or partial operation of the reader 112.

An exemplary back-illuminated image sensor 154 may have pixels arranged in a one or two-dimensional array, wherein the pixels may be adapted to operate in a rolling shutter, global shutter or full frame operating mode which is a color or monochrome 2D CCD, CMOS, NMOS, PMOS, CID, CMD, etc. solid state back-illuminated image sensor. This sensor contains an array of light sensitive photodiodes (or pixels) that convert incident light energy into electric charge. Solid state back-illuminated image sensors allow regions of a full frame of image data to be addressed. In an electronic shutter operating mode known as a full frame (or global) shutter the entire imager is reset before integration to remove any residual signal in the photodiodes. The photodiodes (pixels) then accumulate charge for some period of time (exposure period), with the light collection starting and ending at about the same time for all pixels. At the end of the integration period (time during which light is collected), all charges are simultaneously transferred to light shielded areas of the sensor. The light shield prevents further accumulation of charge during the readout process. The signals are then shifted out of the light shielded areas of the sensor and read out.

The output of the image sensor may be processed utilizing one or more functions or algorithms to condition the signal appropriately for use in further processing downstream, including being digitized to provide a digitized image of target T. Digitizing or digitization may be representing an object, an image, or a signal (usually an analog signal) by a discrete set of its points or samples. The result is digital data called a "digital representation" or, more specifically, a "digital image", for the object, and "digital form", for the signal.

A microcontroller 160 may perform a number of processing functions and be located on board with other components, such as the image sensor. Microcontroller 160 may include a predetermined amount of memory for storing firmware and data. The firmware may be a software program or set of instructions embedded in or programmed on the microcontroller which provides the necessary instructions for how the microcontroller operates and communicates with other hardware. The firmware may be stored in the flash memory (ROM) of the microcontroller as a binary or digital image data file and may be erased and rewritten. The firmware may be considered "semi-permanent" since it remains the same unless it is updated. This firmware update or load may be handled by a device driver.

The components in reader 112 may be connected by one or more bus 168, data lines or other signal or data communication form.

A host processor 118 or a local/host server 170 may be utilized to perform a number of functional operation, which may involve the performance of a number of related steps, the particulars of which may be determined by or based upon certain configuration settings stored in memory 166. Some data may be stored in memory provided as part of the microcontroller 160.

An exemplary function of a processor 118, 170 may be to decode machine readable symbology provided within the target or captured image. One dimensional symbologies may include very large to ultra-small, Code 128, Interleaved 2 of 5, Codabar, Code 93, Code 11, Code 39, UPC, EAN, MSI, or other 1D symbologies. Stacked 1D symbologies may include PDF, Code 16K, Code 49, or other stacked 1D symbologies. 2D symbologies may include Aztec, Datamatrix, Maxicode, QR-code, or other 2D symbologies. Decoding is a term used to describe the interpretation of a machine readable code contained in an image projected on the image sensor 154. The code has data or information encoded therein.

Exemplary functions of a processor or processors 118, 170 may be to facilitate operation of the image capture function, decoding functions, and operator interface functions. Operating software may be utilized to operate the processor for such functions seemingly simultaneously or in a multitasking role.

Imaging reader assembly 112 may also have an aiming generator light source 132, aiming aperture 133, aiming optics 136, an illumination source(s) 146 and illumination optics 148 to create an aiming light pattern projected on or near the target which spans a portion of the receive optical system 150 operational field of view with the intent of assisting the operator to properly aim the scanner at the bar code pattern that is to be read. A number of representative generated aiming patterns are possible and not limited to any particular pattern or type of pattern, such as any combination of rectilinear, linear, circular, elliptical, etc. figures, whether continuous or discontinuous, i.e., defined by sets of discrete dots, dashes and the like. Generally, the aiming light source may comprise any light source which is sufficiently small or concise and bright to provide a desired illumination pattern at the target.

The light sources 132 may also be comprised of one or more laser diodes combined with laser collimation lens (not shown in these drawings) to focus the laser light to a spot generally forward of the scanning hear and approximately at the plane of the target T. This beam may then be imaged through a diffractive interference pattern generating element, such as a holographic element fabricated with a desired pattern.

Illumination and aiming light sources with different colors may be employed. For example, in one such embodiment the reader may include white and red LEDs, red and green LEDs, white, red, and green LEDs, or some other combination chosen in response to, for example, the color of the symbols most commonly imaged by the reader. Different colored LEDs may be each alternatively pulsed at a level in accordance with an overall power budget.

Reader may include an illumination assembly for illuminating target area T which may include one or more power supplies 144, illumination sources 146 and illumination optics 148.

In an exemplary embodiment the illumination source may be a laser for reflecting laser light off the target. This may be referred to laser scanning wherein the reflected laser light is converted into signals reflected off an IBI into IBI signals representative of the converted light. An aiming pattern generator may not be necessary in such an embodiment if the illumination laser provides an aiming function in addition to an illumination function.

A communications module 180 provides a communication link from imaging reader 112 to other imaging readers or to other systems such as a server/remote processor 124.

An exemplary reader 112 may have a display 116 which may be controlled by a display controller 222 which stores display data in a display buffer 210.

An exemplary reader 112 may have a keypad 214 for facilitating control thereof. A battery 218 may be used to provide power to the components of the reader.

The processor, memory and associated circuitry which performs or controls exemplary data reading, such as image capture and decoding functions may be provided in the reader or on associated circuit boards which are located within the housing 117 of the reader 112.

A reader may be placed or stored in a stand during operation or for storage. FIGS. 3a-3d illustrate four exemplary reader systems 310-313 wherein four exemplary readers 320-323 are disposed in respective exemplary stands 330-333. Each stand comprises a common base 340 and hinge 344 with differing respective arms or flange portions and reader holder or cradle portions. The flange portion and cradle portion of the reader stands comprise a cradle arm. Exemplary reader stands are adapted for retaining a reader in a manner that permits placement, usage and removal from the respective stand. An exemplary base is adapted for sitting on a relatively flat surface and provides a stable platform for operation of the reader it is holding in order to prevent the reader from falling or tipping over. The reader may be rotated on the stand for optimal reading or operational performance.

Figure 4:
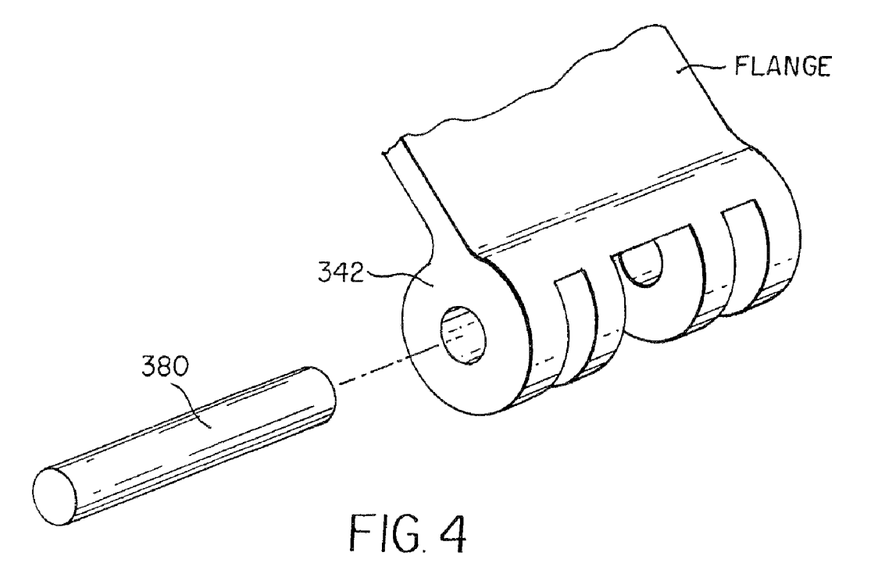
FIG. 4 is a perspective exploded view of an exemplary flange and flange mating hinge of an exemplary reader system.

Referring to FIG. 4 an exemplary respective Flange has a flange hinge mating section 342 which mates with the common base hinge mating section (not shown). The flange hinge mating section and base hinge mating section are held together by a pin 380 to form the hinge 344. The Flange and cradle (not shown) are adapted for holding an exemplary specific reader. The Flange may rotatably connected to the base by the hinge 344, which facilitates the Flange to be rotated with respect to the base 340. The Flange may be manufactured as part and parcel with the flange hinge mating section. The base may be manufactured as part and parcel with the base hinge mating section. The Flange and base 340 are thus pivotally or rotatably connected to one another.

In an exemplary embodiment the hinge is detachably attached to the base and the flange and cradle are permanently attached to the hinge outer member. Different stands may be thus be constructed for different readers by detaching a first integral hinge/flange/cradle adapted for holding a first exemplary reader from the base and replacing it with a second integral hinge/flange/cradle adapted for holding a second exemplary reader to the base.

In an exemplary embodiment the flange is detachably attached to the hinge. Different stands may be thus be constructed for different readers by detaching a first integral flange/cradle adapted for holding a first exemplary reader from the hinge and replacing it with a second integral hinge/flange/cradle adapted for holding a second exemplary reader to the hinge.

Figure 3A:
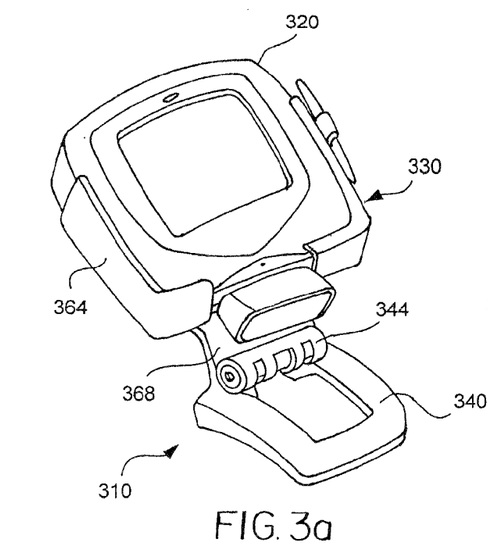
FIGS. 3a-3d are perspective views of exemplary reader systems.

Referring to FIG. 3a, an exemplary reading system 310 comprises a transaction terminal reader 320 which is held by a stand 330, comprised of a base 340, a hinge 344, a flange portion 368 and a cradle portion 364 which is adapted to retain or hold transaction terminal reader 320. The cradle portion 364 and flange portion 368 are rotatably connected to the base by hinge 344. Cradle portion 364 may be comprised of a pair of brackets which hold the reader and prevent horizontal (side to side) type movement or rocking movement which would cause the reader to fall out. The reader may be placed in the cradle portion by sliding it from the top of the cradle to the bottom.

Exemplary transaction terminal readers are in use today at locations where a person makes a transaction in an establishment, such as a retail store, restaurant, etc. Integrated in the top of terminal 320 is a touch screen display. Disposed in the housing may be one or more readers for obtaining information from an information bearing device, such as a card having a magnetic strip, symbol indicia such as a bar code, an RFID instrument, biogenic information such as a fingerprint, etc. An exemplary transaction terminal reader is described in commonly owned U.S. Pat. No. 7,472,825 entitled TRANSACTION TERMINAL, the disclosure of which is hereby incorporated herein by reference.

Figure 3B:
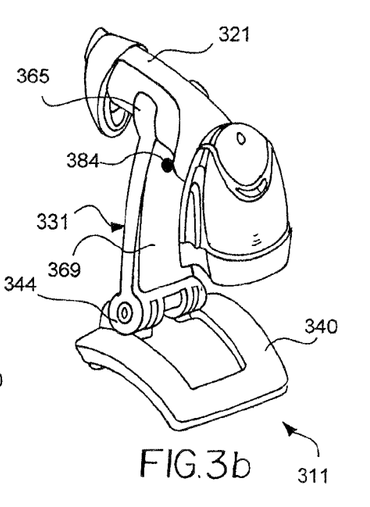

Referring to FIG. 3b, an exemplary reading system 311 comprises an indicia reader 321 which is held by a stand 331. Stand 331 is comprised of a base 340, a hinge 344, a flange portion 369 and a cradle portion 365 which is adapted to retain or hold indicia reader 321. The cradle portion 365 and flange portion 369 are rotatably connected to the base by hinge 344. Cradle portion 365 may be comprised of a pair of brackets which hold the reader and prevent horizontal (side to side) type movement or rocking movement which would cause the reader to fall out. The reader may be placed in the cradle portion by pushing it into the cradle between the brackets.

Figures 3C, 3D:
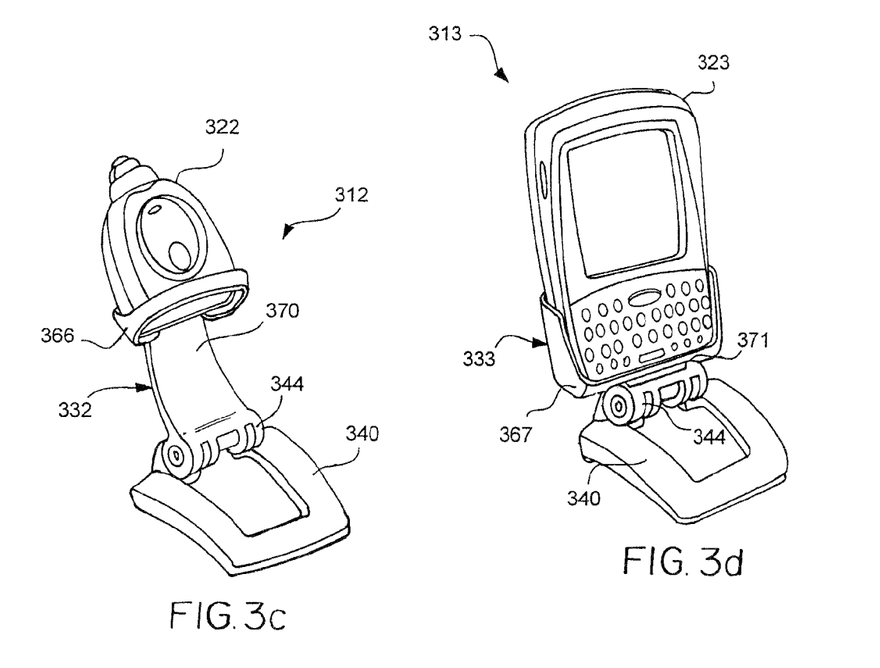

Referring to FIG. 3c, an exemplary reading system 312 comprises an indicia reader 322 which is held by a stand 332. Stand 332 is comprised of a base 340, a hinge 344, a flange portion 370 and a cradle portion 366 which is adapted to retain or hold indicia reader 322. The cradle portion 366 and flange portion 370 are rotatably connected to the base by hinge 344. Cradle portion 365 may be comprised of a doughnut type bracket which holds the reader and prevents horizontal (side to side) type movement or rocking movement which would cause the reader to fall out. The reader may be placed in the cradle portion by placing it's front face it into the cradle and into the hole of bracket.

Referring to FIG. 3d, an exemplary reading system 313 comprises a mobile device type reader 323 which is held by a stand 333, comprised of a base 340, a hinge 344, a flange portion 371 and a cradle portion 367 which is adapted to retain or hold mobile device reader 323. The cradle portion 367 and flange portion 371 are rotatably connected to the base by hinge 344. Cradle portion 367 may be comprised of a pair of brackets which hold the reader and prevent horizontal (side to side) type movement or rocking movement which would cause the reader to fall out. The reader may be placed in the cradle portion by sliding it from the top of the cradle to the bottom.

In an exemplary embodiment, the stand configuration is adapted for an indicia scanner to scan downward wherein information bearing indicia (IBI) is placed below the scanner for IBI reading. The length of the flange is adapted to be appropriate for the focal length of the indicia reader if the indicia reader is an optical indicia reader. The rotational position of the flange is adapted for optimal data reading and operational performance. Operation of the scanning, which may be executed in a user or factory selectable relationship to a scanning routine, may be governed by parameters which control the codes which are enabled for processing as a part of an autodiscrimination process, whether decoding is to be continuous or discontinuous, etc. Permitted combinations of scanning and decoding parameters together define the scanning-decoding relationships or modes which the reader will use. In the continuous mode (also referred to as continuous scanning mode, continuous streaming mode, streaming mode, fly-by scanning mode, on the fly scanning mode or presentation mode) the reader is held in a stationary manner and targets (such as symbols located on packages) are passed by the reader. In the continuous mode, the reader takes continuous image exposures seriatim and continuously decodes or attempts to decode some or all of these images. In the continuous mode exposure times and decoding times are limited.

Discontinuous mode is a mode wherein scanning and/or decoding stops or is interrupted and must have an actuation event, such as pulling or pushing of a trigger or placing an IBI in the reader field of view. An exemplary utilization of the reader in discontinuous mode is via hand held operation. While triggered, the reader may expose images continuously and decode images continuously. Decoding stops once the reader is no longer triggered. Exposing of images, however may continue. In the discontinuous mode, the exposure time, decoding time out limits and decoding aggressiveness may be increased more than those set for continuous mode. It is to be noted that the discontinuous mode is typically initiated because the operator knows a symbol is present. The decoder therefore may forego making a determination of the presence of a symbol because a symbol is presumed to be in the field of view. Discontinuous mode may provide longer range scanning than the continuous mode. Switching between continuous and discontinuous modes may be accomplished by use of a trigger located on the reader. For example, when the trigger is depressed by an operator the reader may operate in a discontinuous mode and when the trigger is released the reader may switch to continuous mode after a predetermined period of time. A scanning subroutine may specify an address buffer space or spaces in which scan data is stored and whether scanning is to be continuous or discontinuous. Another example of switching between continuous and discontinuous modes may be accomplished by symbology wherein switching between the modes depends on the type of symbology detected. The reader may stop attempting to decode a symbol after a predetermined time limit. The reader, may limit the type of symbols to decode when in the continuous mode.

The aiming pattern generator may be programmed to operate in either continuous or discontinuous modes.

In the continuous mode, the present device may be configured to automatically switch to a reduced power state if no symbol has been sensed for a period of time. Upon sensing of a symbol the scanner may then automatically switch back to the higher power state continuous mode. In this reduced power state the scanner may change from having the aimer and/or illumination light sources on for every scan to having either/or on for only some of the scans (e.g. every 2 or 3 or less scans). In this manner the system may still be in a position to sense the presence of a symbol, but will draw less current and also generate less internal heating. After sensing a symbol, the reader may utilize aiming/illumination for every scan until another period of inactivity is sensed. Mode changes may be accomplished by a host computer in response to an appropriate signal over either a direct connection or wireless connection to the scanner.

An exemplary image reading system may have automatic switching between continuous mode and discontinuous mode. An exemplary switching method between these modes may be accomplished with a stand detector 384 (FIG. 3b) to detect whether the reader is on the stand. If the reader is on the stand, then the reader switches to continuous mode whereas if it switches to discontinuous mode when not in the stand. The detector may be implemented in various technologies including optical sensing, electromagnetic sensing, or mechanical sensing. For optical sensing, detector may have IBI type attributes that may be read by the reader. When the reader detects a specific bar/space sequence, then it will automatically switch to continuous mode, otherwise, it will switch to the handheld mode. For electromagnetic sensing, the detector may be a magnet. For mechanical sensing, the detector may be a switch located in a position in which placement of the image reader is placed in the stand the switch is depressed.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The described embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

The invention claimed is:

1. A handheld reading system comprising:
   a universal stand holding a handheld reading device that collects and processes machine readable data, wherein the universal stand comprises:
   a base adapted for placement on a surface, wherein the base provides holding stability to the stand and to the reading device being held;
   a cradle arm having a flange portion and a cradle portion at opposite ends thereof, wherein the cradle portion is operable to secure the handheld reading device in a secure position within the cradle; and,
   a hinge rotatably connecting the flange of the cradle arm to the base,
   and wherein the hinge comprises a flange mating section of the cradle arm and a base hinge mating section of the base held together by a detachable pin, and
   wherein the cradle arm is replaceable by detachment of the pin to enable the base to be used for providing holding stability for more than one type of hand held reading device requiring a different cradle arm for more than one type of reading device; and wherein the hand held reading system further comprises a hand held reading device operable to read machine readable information from a machine readable information bearing indicia and wherein the hand held reading device is operable to read the information both while placed in the universal stand and while used in a hand held mode of operation.

2. The system in accordance with claim 1, wherein the hand held reading device comprises:

an image sensor for converting light reflected from an information bearing indicia (IBI) into output signals representative thereof;

receive optics for directing light from the target to the image sensor;

a processor for decoding the output signals;

an illumination source for generating illumination light illuminating the target and illumination optics for directing the illumination light onto the target;

a housing encompassing the image sensor, receive optics and illumination source adapted for hand held operation.

3. The system in accordance with claim 1, wherein the hand held reading device comprises an optical indicia reader which is at least one of the following: a transaction terminal; a hand held indicia reader; a PDT; and a PDA.

4. The system in accordance with claim 1, further comprising a sensor located in the stand for detecting whether the hand held reading device is disposed in the cradle portion or not.

5. The system in accordance with claim 1, further comprising a sensor located in the stand for detecting whether the hand held reading device is disposed in the cradle portion or not and wherein the operational characteristics of the hand held reading device change whether the hand held reading device is in the stand or not.

* * * * *